INVENTOR.
WALLACE V. SORNSEN
BY Merchant & Gould
ATTORNEYS

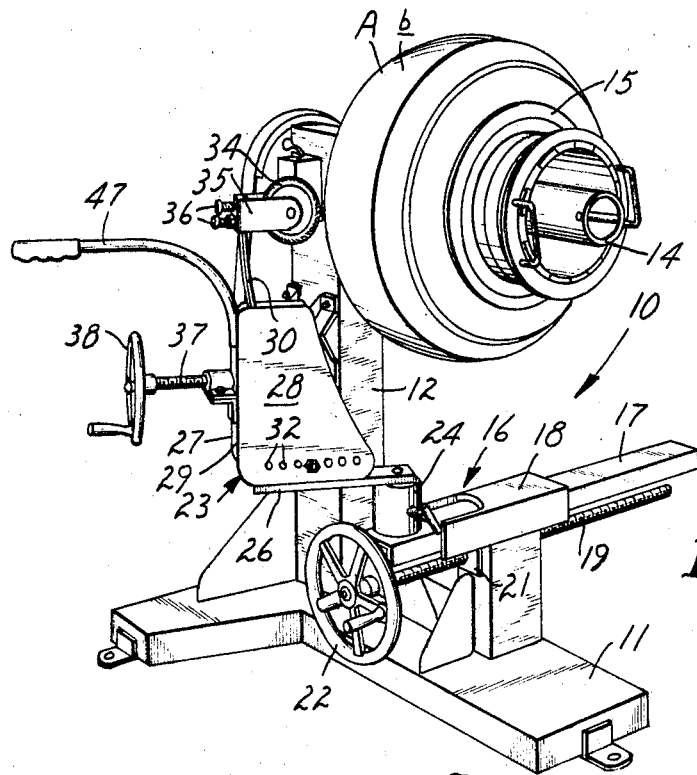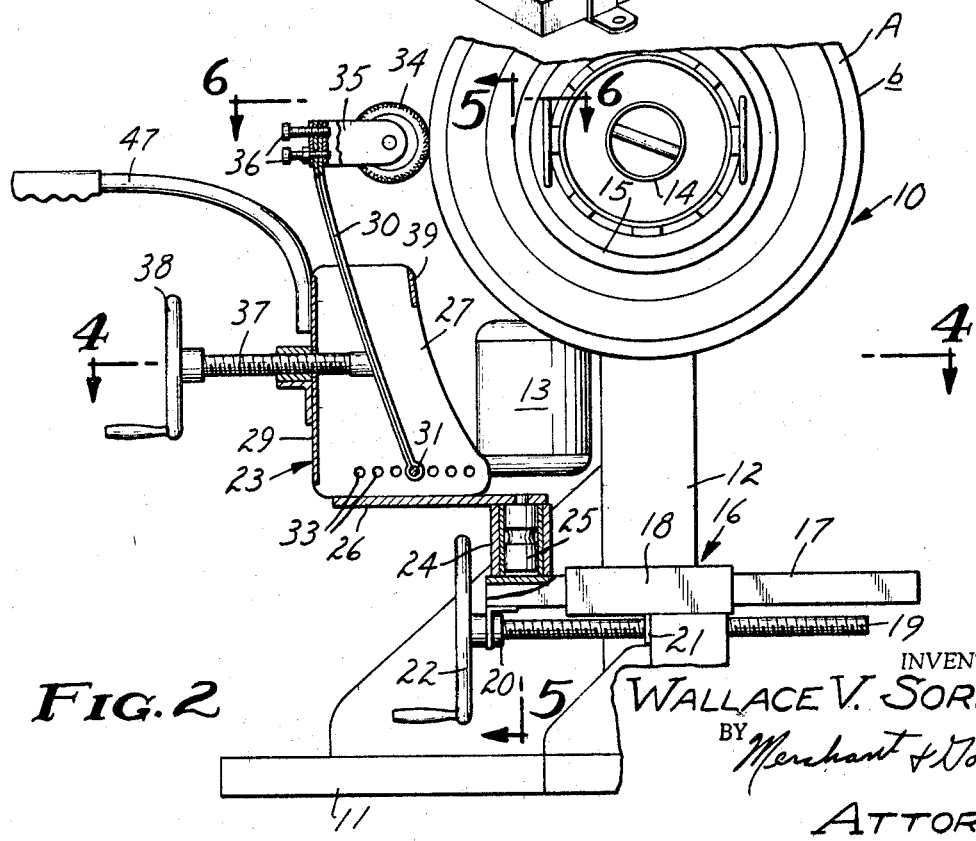

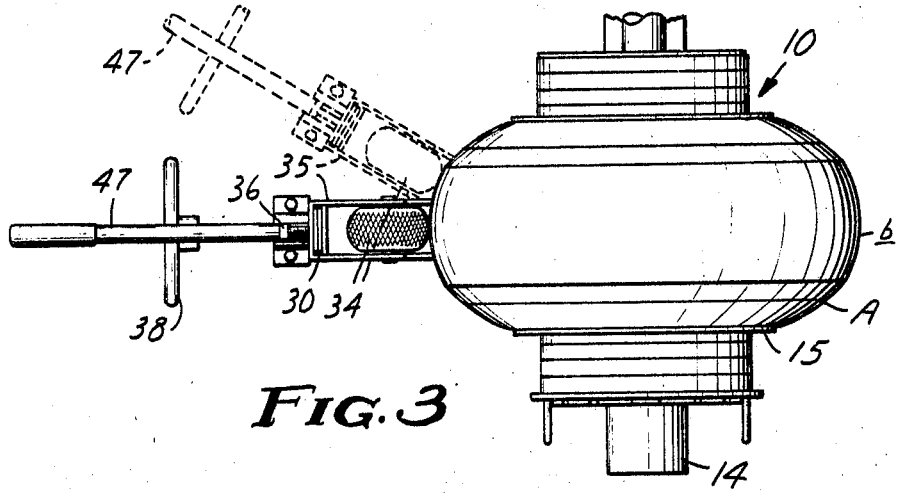
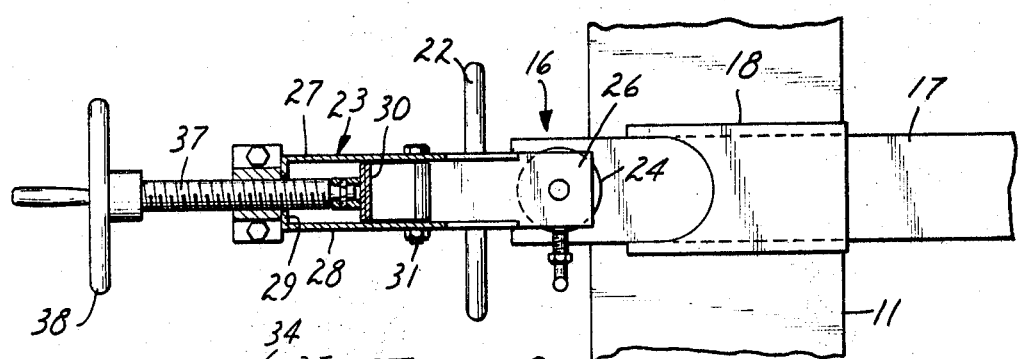
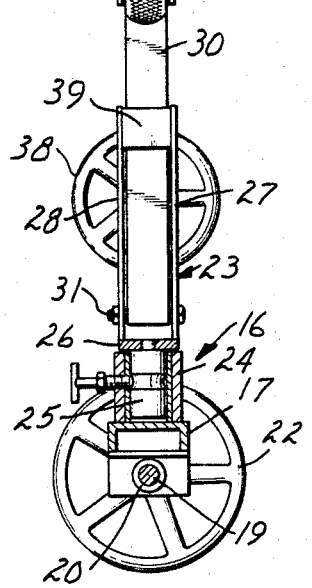
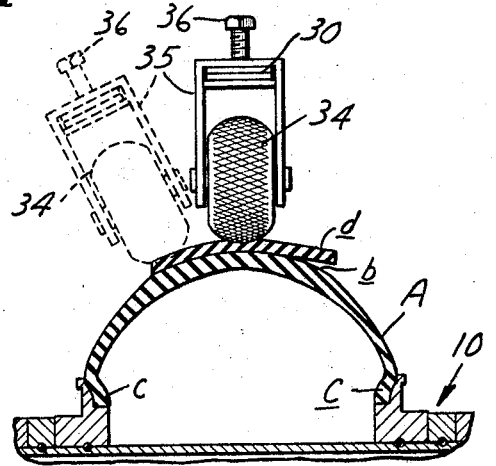

_United States Patent Office_

3,423,272
Patented Jan. 21, 1969

3,423,272
STITCHING MACHINE AND TIRE BUILDER
Wallace V. Sornsen, Minneapolis, Minn., assignor to Paul E. Hawkinson, Minneapolis, Minn., a corporation of Minnesota
Filed Jan. 10, 1966, Ser. No. 519,571
U.S. Cl. 156—410        9 Claims
Int. Cl. B29h 17/37

ABSTRACT OF THE DISCLOSURE

A tire tread stitcher with the stitching wheel mounted on a resilient arm having adjusting means to provide as it is passed over the surface of the retread rubber, adequate pressure throughout an arc corresponding to the crown radius of the finished tire.

My invention relates generally to tire repair equipment and more particularly to tire repair equipment utilized in the tire recapping industry.

Still more particularly, my invention relates to a tire rebuilding machine including stitching mechanism for mounting a strip of camelback to the buffed crown of different size tires mounted on such a machine in a rolling radius condition, that is, with the beads of the tire spread and the diameter thereof reduced as disclosed in Patent 1,917,262, issued July 11, 1933.

In recapping operations it is conventional to mount a tire carcass and rim on which it is mounted on a rotary power head for common rotation with the power output shaft thereof. A strip of uncured rubber or camelback is loosely adhered to the buffed crown portion of the tire carcass. Thereafter the strip of camelback is caused to be tightly adhered to such a carcass by means of a stitching wheel which is brought into engagement with the strip of camelback and moved through an arc of travel corresponding generally to the crown radius of the tire during rotation of the tire. Since the crown radius increases in proportion to the increase in diametric dimensions of tires and also during spreading of the beads thereof, such an arc of travel of the stitching wheel must therefore be variably relative to such a radius. Ideally the stitching wheel should maintain an adequate pressure throughout such an arc of travel regardless of the crown radius of the particular tire being recapped.

It is therefore a primary object of my invention to provide a device of the class above described which provides a stitching wheel mounted on a resilient arm and which is capable of applying adequate pressure to a strip of camelback being mounted on a tire regardless of the crown radius of such a tire.

It is another object of my invention to provide a device of the class above described in which the stitching wheel thereof is mounted for adjustments with respect to both the diameter and the crown radius of a tire carcass being worked on.

It is another object of my invention to provide a device of the class above described which is rugged and durable in construction, relatively inexpensive to manufacture, and fully capable of performing its intended task with a minimum of skill and effort on the part of an operator.

These and further highly important objects of my invention will become apparent to those skilled in the art from consideration of the following detailed specification, appended claims and attached drawings.

Referring to the drawings, wherein like reference characters indicate like parts throughout the several views:

FIG. 1 is a view in perspective showing a tire rebuilding machine utilizing my novel construction;

FIGURE 2 is an enlarged view in elevation of the structure of FIG. 1, portions thereof being broken away and shown in section;

FIG. 3 is a view in top plan of a portion of FIG. 1 on an enlarged scale;

FIG. 4 is a view in horizontal section as seen from the line 4—4 of FIG. 2, portions thereof being broken away;

FIG. 5 is a view in vertical section as seen from the line 5—5 of FIG. 2, portions thereof being removed;

FIG. 6 is a view in horizontal section as seen from the line 6—6 of FIG. 2;

Figure 7:
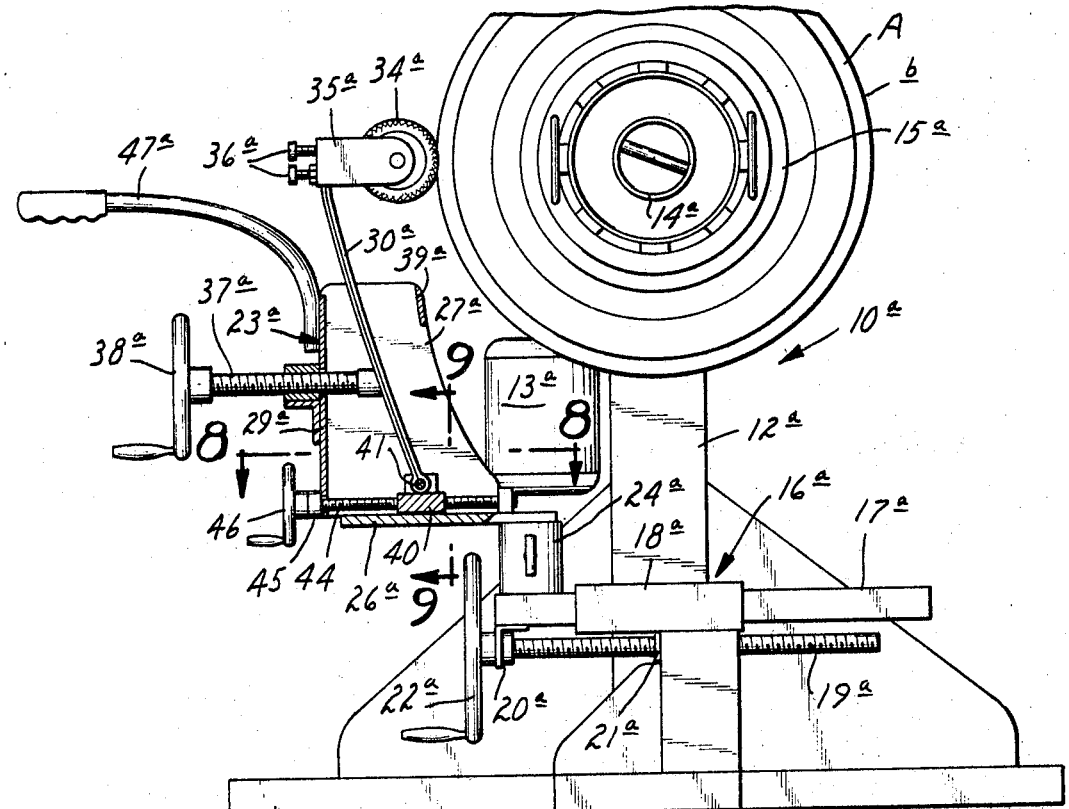
FIG. 7 is a view similar to FIG. 2 showing a modified adjustment means for the stitching mechanism.

Referring with greater particularity to the drawings, and initially to FIG. 1-6, there is shown a tire rebuilding machine indicated in its entirety by the numeral 10. Machine 10 includes the base 11 which supports a standard 12. A power head having a gear head equipped, electrically operated motor 13 is carried by the standard 12 and is adapted to drive a horizontally disposed, laterally projecting rotary output shaft 14. Mounted on the extended end of shaft 14, for common rotation therewith, is the rim 15 of a tire carcass A to be worked upon.

It should here be noted that, normally, the radius of the crown portion $b$ of a tire A varies relative to the diameter of such a tire A. Also, if the tire A is mounted on the rim 15 with the beads $c$ thereof in a spread apart condition, such as that shown in FIG. 6, the crown radius $b$ will be increased or varied from the normal. In either case, a strip of uncured rubber material or camelback $d$ is mounted loosely to the previously buffed and adhesive prepared crown portion $b$ of a tire A and, thereafter, caused to be tightly adhered to such a crown portion $b$ by means of stitching mechanism indicated generally by the numeral 16 and described in greater detail immediately hereinafter.

Stitching mechanism 16 is comprised of a horizontally disposed carriage 17 which generally underlies the extended tire A and is mounted for limited horizontal movements normal to the shaft 14 by means of the way element 18 carried by the base 11. Such movements are imparted by means of the threaded shaft 19 which is journalled for rotation at its outer end to carriage 17 by bearing bracket 20 and has threaded engagement with way element 18 as at 21. To facilitate adjustments of carriage 17 shaft 19 is provided at its outer end with the enlarged wheel-like crank 22.

A stitching wheel mounting head 23 is mounted on carriage 17 for pivotal swinging movements about a vertical axis by means of a vertically disposed sleeve-like bearing 24 carried by the carriage 18 and a post 25, depending from the mounting head 23, which is telescopically received within the bearing 24. Head 23 includes the plate-like base 26 extending radially from the post 25 and a pair of vertically extending side walls 27, 28 which are connected at their outermost edge by the connecting wall portion 29.

An elongated resilient arm 30 has its lower end pivotally secured between the lower portion of the vertical extended side walls 27, 28 by means of a pin 31 which is receivable through a bearing, carried by the lower end of arm 30, and selected ones of a plurality of aligned pairs of apertures 32, 33. Apertures 32, 33 are formed in the lower portion of walls 27, 28 respectively and spaced in a direction radially of the post 24. A stitching wheel 34 is journalled for rotation to the upper end of the arm 30 by means of the bifurcated bracket 35 which, as shown, is secured to the arm 30 by means of the bolts 36.

For the purpose of imparting movement to the upper end of the arm 30 and stitching wheel 34, carried thereby, toward the crown b of a tire A there is provided a movable element in the nature of a threaded shaft 37. Shaft 37 has threaded engagement with the wall 29 in such a manner as to cause engagement of the inner end thereof with the intermediate portion of arm 30 between the pin 31 and stitching wheel 34. An enlarged wheel-like crank 38 is secured to the outer end of shaft 37, to facilitate rotation of shaft 37, to cause such engagement and to move the stitching wheel 34 toward the extended axis of the pivotal movement of the head 23. It will be noted that a stop member 39 is provided to limit movement of the stitching wheel 34 toward the tire A.

Figure 8:
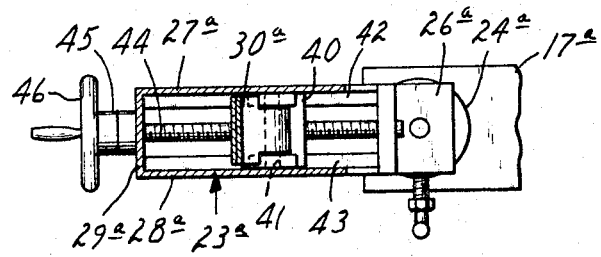
FIG. 8 is an enlarged view in horizontal section as seen from the line 8—8 of FIG. 7.
Figure 9:
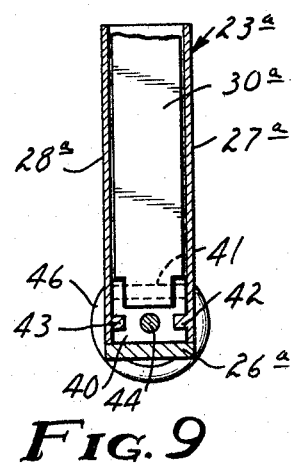
FIG. 9 is an enlarged view in vertical section as seen from the line 9—9 of FIG. 7.

In the FIGS. 7–9 there is shown a modified means which permits adjustment of the wheel 34 with respect to the extended axis of pivotal movement of mounting head 23. Elements of FIGS. 7–9 similar to elements of FIG. 1–6 will have similar numerals with the suffix a added.

In the structure of FIGS. 7–9 the arm 30a is pivotally secured to a nut element 40 as at 41. Nut element 40 is mounted and guided for movements toward and away from the extended axis of pivotal movement of head 23a by means of the way elements 42, 43 which are affixed to the lower portion of the vertical side wall elements 27a, 28a respectfully. Imparting such movements to nut 40 is a screw threaded shaft 44 which has thread engagement with nut 40 and is journalled for rotation, adjacent its outer end, in the lower portion of wall element 29a, as at 45. A wheel-like crank 46 is secured to the outer end of shaft 44 to facilitate rotation of shaft 44. A movable element 37a, similar to shaft 37, has threaded engagement with the wall element 29a of head 23a in a manner to cause the inner end thereof to engage the arm 30a at a point intermediate the nut 40 and stitching wheel 34a. Upon rotation of shaft 37a arm 30a positions stitching wheel 37a relative to the extended vertical axis of pivotal movement of head 23a and the crown radius of the tire A.

A description of a particular setup of tire rebuilding machine 10 is as follows. A tire carcass A is first mounted on a rim 15 and the crown portion b thereof buffed and prepared with a suitable adhesive. Carriage 17 is then adjusted to cause same to move to the left with respect to FIG. 2 to permit mounting of the tire A and rim 15 on shaft 14 for common rotation therewith. Motor 13 is now energized and a strip of uncured rubber or camelback d is applied to the previously prepared crown b of tire A and carriage 17 is adjusted to the right with respect to FIG. 2 to bring the stitching wheel 34 into closely spaced relation to the strip of camelback d. It will here be noted that tire A is so mounted on the rim 15 that an extending plane bisecting the tire A and normal to the axis of tire A intersects the extended axis of pivotal movement of mounting head 23 or 23a. As such, the pivotal movement of head 23 or 23a and consequently stitching wheel 34 or 34a, is symmetrical on opposite sides of such an extended plane.

An operator now must adjust the stitching wheel in a manner to cause same to describe an arc of travel similar to the radius of the crown portion b of tire A. This is accomplished by manipulating crank 38 or 38a and threaded shaft 37 or 37a to cause the stitching wheel 34 or 34a to assume its correct position relative to the extended axis of pivotal movement of head 23 or 23a. Thereafter the carriage is moved to the right with respect to FIG. 2 until the wheel 34 or 34a is engaged with the strip of camelback d under the yielding bias of the resilient arm 30 or 30a. Subsequent movement of the head 23 or 23a about its pivotal axis, through the medium of the laterally projecting handle 47, during rotation of the tire A on shaft 14, results in the stitching wheel 34 or 34a being tightly pressed against the strip of camelback d under the yielding bias of the arm 30 or 30a throughout its arc of travel over the crown b of tire A. The above is true in spite of any small discrepancy which may occur in the prior adjustments.

Ideally a correct adjustment would be to position the extended axis of pivotal movement of head 23 or 23a in vertical alignment with the center of the crown radius of the particular tire A being worked upon. This, of course, would be extremely difficult to achieve, thus the resiliency of arm 30 or 30a is intended to compensate for any such slight misadjustment and still maintain the stitching wheel 34 or 34a under adequate pressure against the strip of camelback d to cause same to be tightly adhered to the crown b of tire A throughout the radius of the crown b.

It will be further noted that the best results of the stitching operation occur when the axis of the stitching wheel 34 or 34a operates in an extended plane which bisects the axis of the shaft 14 and tire A during pivotal movement of the head 23 or 23a. Should excessive adjustment of the shaft 37 or 37a cause the axis of the stitching wheel 34 or 34a to be disposed either above or below such a plane, the pin 31 associated with arm 30 may be removed and moved to an appropriate set of adjustment apertures 33, 34 or the nut 40 associated with arm 30a adjusted, through the medium of shaft 44, to return the axis of the stitching wheel to its correct position. This, of course, would necessitate further adjustment of the arm 30, 30a through the medium of shaft 37 or 37a, to bring the stitching wheel back to its correct position relative to the extended axis of pivotal movement of head 23 or 23a.

My invention has been thoroughly tested and found to be completely satisfactory for the accomplishment of the above objects, and while I have shown and described a preferred embodiment, I wish it to be understood that the same is capable of modification without departure from the spirit and scope of the appended claims.

What is claimed is:

1. In a tire stitching machine having a base, a standard on said base, a power head on said standard including a horizontally disposed rotary output shaft projecting laterally from said power head in overlying relationship to said base, means for detachably mounting a pneumatic tire on said shaft for common rotation therewith, and stitching mechanism carried by said base in laterally spaced relation to said standard, said stiching mechanism comprising:
   (a) a horizontally disposed carriage generally underlying the power output shaft;
   (b) means mounting and guiding said carriage for limited horizontal movements in a direction normal to the axis of said shaft;
   (c) a stitching wheel mounting head mounted on said carriage for pivotal swinging movements about a vertical axis;
   (d) an elongated resilient arm;
   (e) means mounting said arm on said mounting head for flexural movement of end of said arm toward and away from said extended axis;
   (f) a stitching wheel journalled for rotation on a horizontal axis on said end of said arm; and
   (g) means for imparting movements to said arm toward and away from said extended axis whereby said stitching wheel is moved into and maintained in yielding engagement with the crown portion of a tire mounted on said shaft during rotation of said shaft and swinging movements of said mounting head about pivot axis thereof.

2. The structure of claim 1 including means for imparting said movements of said carriage relative to said means mounting and guiding same whereby tires having different diameters mounted on said shaft may be operatively engaged by said stitching wheel.

3. The structure of claim 1 in which the means mounting said arm on said mounting head comprises a plurality of apertures defined by said mounting head and spaced in a direction radially of the pivotal axis thereof, and a pin carried by the other end of said arm and receivable in a selected one of said apertures.

4. The structure of claim 3 in which the means for imparting said movement to said one end of said arm includes a movable element carried by said mounting head and engageable with said arm intermediate said pin and said stitching wheel and operable to move said arm and wheel about the axis of said pin toward the crown of a tire mounted on said shaft.

5. The structure of claim 3 including means limiting movement of said arm in a plane parallel to and bisecting the axis of said pin.

6. The structure of claim 1 in which the means mounting said arm on said mounting head comprises:
(a) a nut element;
(b) means pivotally securing the other end of said arm to said nut element;
(c) means mounting and guiding said nut element on said mounting head for movement toward and away from the extended pivot axis of said mounting head; and
(d) means carried by said mounting head for imparting said movements to said nut and arm.

7. The structure of claim 6 in which the means for imparting movement to said one end of said arm includes a movable element carried by said mounting head and engageable with said arm intermediate the ends of said arm and operable to move said wheel about the pivot axis of said arm toward the crown portion of a tire mounted on said shaft.

8. The structure of claim 6 including means limiting movements of said arm in a plane parallel to and bisecting the axis of the pivotal connection of said arm.

9. The structure of claim 1 including stop means defined by said mounting head adapted to limit movement of said resilient arm and stitching wheel in a direction toward said extended axis of pivotal movement of said mounting head.

References Cited

UNITED STATES PATENTS

| | | | |
|---|---|---|---|
| 1,394,186 | 10/1921 | Weatherill | 156—408 X |
| 1,309,894 | 7/1919 | Kilborn | 156—411 X |
| 2,936,023 | 5/1960 | Giletta et al. | 156—410 |
| 3,331,412 | 7/1967 | Sornsen | 156—96 X |

EARL M. BERGERT, *Primary Examiner.*

C. B. COSBY, *Assistant Examiner.*

U.S. Cl. X.R.

156—421, 96